United States Patent [19]

Kunert

[11] Patent Number: 4,944,984
[45] Date of Patent: Jul. 31, 1990

[54] WINDOW GLASS FOR MOTOR VEHICLES AND A METHOD FOR THE MANUFACTURE THEREOF

[75] Inventor: Heinz Kunert, Cologne, Fed. Rep. of Germany

[73] Assignee: Saint-Gobain Recherche, Aubervilliers, France

[21] Appl. No.: 193,224

[22] Filed: May 11, 1988

Related U.S. Application Data

[63] Continuation of Ser. No. 28,064, Mar. 19, 1987, abandoned, which is a continuation of Ser. No. 624,122, Jun. 25, 1984, abandoned.

[30] Foreign Application Priority Data

Jun. 24, 1983 [DE] Fed. Rep. of Germany ....... 3322799

[51] Int. Cl.$^5$ .............................................. B32B 3/02
[52] U.S. Cl. ...................................... 428/83; 24/564; 296/84.1
[58] Field of Search ........................... 428/34, 83, 140; 24/564; 296/84.1

[56] References Cited

U.S. PATENT DOCUMENTS

| | | | |
|---|---|---|---|
| 1,375,914 | 3/1920 | Kimbark | 49/462 |
| 3,113,435 | 12/1963 | Yount | 428/140 |
| 3,214,212 | 10/1965 | Horton | 428/140 |
| 3,214,778 | 11/1965 | Mathison | 24/564 |
| 3,241,277 | 3/1966 | Coppock | 156/108 |
| 3,434,903 | 3/1969 | Hann | 156/108 |
| 3,509,882 | 5/1970 | Blake | 24/564 |
| 3,527,013 | 9/1970 | Kruschwitz | 428/83 |
| 3,779,794 | 12/1973 | DeSantis | 428/429 |
| 3,968,612 | 7/1976 | Endo | 156/108 |
| 4,195,148 | 5/1980 | Hagen | 427/421 |
| 4,210,356 | 7/1980 | Juneman | 296/84 A |
| 4,240,853 | 12/1980 | Pustka | 156/108 |
| 4,480,417 | 11/1984 | Evers | 428/83 |

FOREIGN PATENT DOCUMENTS

| | | |
|---|---|---|
| 61027 | 9/1982 | European Pat. Off. |
| 1271571 | 6/1968 | Fed. Rep. of Germany |
| 1534170 | 6/1968 | France |

*Primary Examiner*—Richard Bueker
*Attorney, Agent, or Firm*—Oblon, Spivak, McClelland, Maier & Neustadt

[57] ABSTRACT

A window glass having shaped metallic brackets with a U-shaped cross section which are force-fittingly connected by clamping to the edge areas of the glass, wherein the window glass is provide on at least one surface on the edge area overlapped by the shaped metallic bracket with a raised layer which securely adheres to the glass surface and which is made of a highly elastic polymer which produces a large-surface force connection to the abutting shaped shank with partial elastic deformation. The window glass avoids the use of adhesives between the shaped brackets and glass surface and is suitable for industrial production.

2 Claims, 2 Drawing Sheets

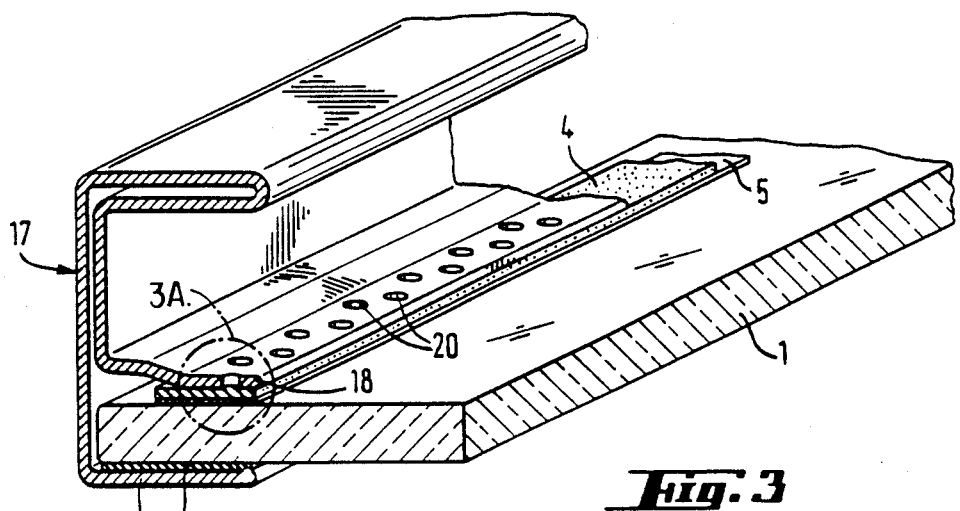
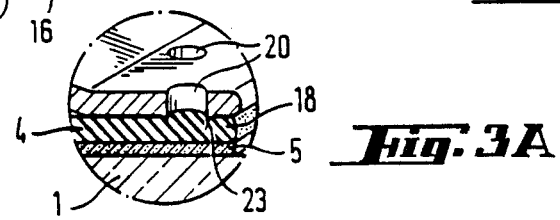
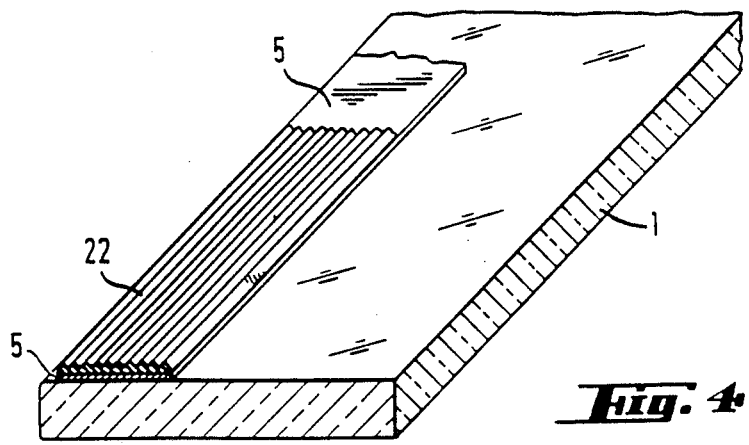

WINDOW GLASS FOR MOTOR VEHICLES AND A METHOD FOR THE MANUFACTURE THEREOF

This application is a continuation of application Ser. No. 07/028064, filed on Mar. 19, 1987, now abandoned, which is a continuation of application Ser. No. 06/624122, filed June 25, 1984, now abandoned.

BACKGROUND OF THE INVENTION

1. Field of the Invention:

This invention relates to plate glass, particularly window glass for motor vehicles, which has shaped metallic brackets or border moldings, having a U-shaped cross section, attached by clamping to the edge areas of the glass.

2. Description of the Prior Art:

Window glass having one or more pressed-on brackets or border molding are used, for example, as lowerable door windows in motor vehicles. With lowerable door windows of this type, it is known to arrange a baked-on layer of a rough surfaced ceramic paint along the lower edge of the glass plate, and to press a U-shaped metallic bracket, with an intermediate strip or shaped section of an elastically resilient material, onto the edge area. This metallic bracket transfers the mechanical forces to the window glass to open and close the window. The ceramic layer serves to increase the adhesive effect (DE-OS 30 30 948).

It is also known and common to attach metallic brackets having a U-shaped attachment section to window glass with an intermediate cured or hardened adhesive therebetween. The attachment of shaped brackets with an intermediate adhesive does result in a durable connection, but it has the disadvantage that the common adhesives require a lengthy curing period. During this hardening period the glass plates cannot be processed further. For example, the glass plates cannot be built into an automobile body, because the metallic bracket can thereby shift on the window glass. The mounting of the shaped brackets on the window glass with the use of an adhesive, therefore, cannot take place on the conveyor line of a motor vehicle assembly line, but rather the mounting process must take place previously and at a different location. This requires an additional labor and transportation expense with corresponding associated costs.

Therefore, a need continues to exist for a window glass with a shaped metallic bracket attached thereto without the necessity of using an adhesive between the shaped metallic bracket and the window glass.

SUMMARY OF THE INVENTION

Accordingly, it is an object of the present invention to provide a window glass with a shaped metallic bracket attached thereto without the necessity of using an adhesive between the shaped metallic brackets and the window glass.

It is also an object of this invention to provide such a window glass which has a durable connection between the shaped metallic brackets and the window glass.

Moreover, it is also an object of the present invention to provide a method for the production of such a glass plate which is suitable for industrial use.

According to the present invention, the foregoing and other objects are attained by providing a window glass having shaped metallic brackets with a U-shaped cross section which are force-fittingly connected by clamping to the edge areas of the glass, wherein the window glass is provided on at least one surface on the edge area overlapped by the shaped metallic bracket with a raised layer which securely adheres to the glass surface and which is made of a highly elastic polymer which produces a large-surface force connection to the abutting shaped shank with partial elastic deformation.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference characters designate like or corresponding parts and wherein:

FIGS. 1 to 3 are various embodiments of a glass window according to the present invention with a shaped bracket having an E-shaped cross section.

FIG. 4 is a glass window having a rubber-elastic layer with a rippled surface arranged along one edge.

DETAILED DESCRIPTION OF THE PREFERRED EMBODIMENTS

Figure 1:
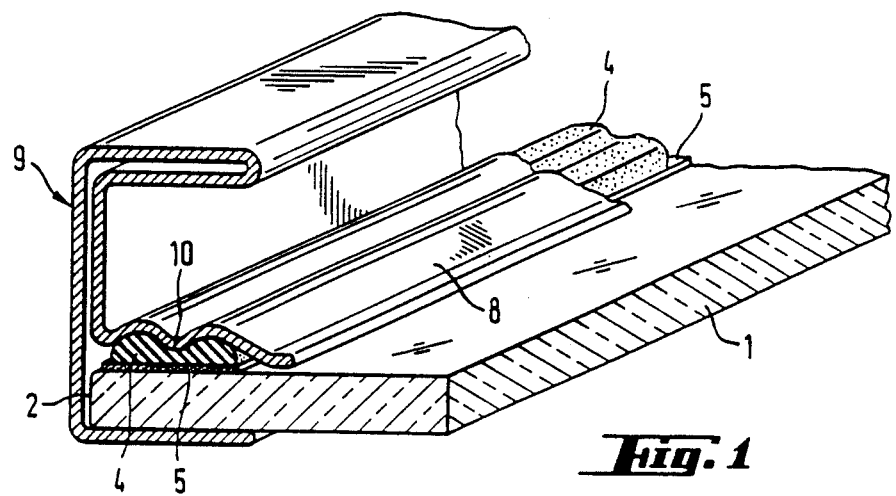

According to the present invention, a plate glass for windows is now provided, which is suitable for the clamp-mounting of one or more metallic brackets on the edge of the window glass, without the necessity of using glue between the shaped bracket and the window glass. In addition, the invention also provides a method suitable for industrial practice for the manufacture of such a glass plate, i.e. for the durable connection of metallic shaped brackets to the edge of the glass plate without a mutual adhesive.

The window glass of the present invention is attained by providing the edge area of the window glass, which will later be covered by the metallic shaped bracket, at least on one side of the glass, with a securely adhering raised layer of a highly elastic polymer.

The elastic layer, which should have a height of at least approximately 0.5 mm, not only significantly increases the coefficient of friction, but also has the primary effect that it is elastically deformed by the clamping section, is adapted to the cross section of the clamping section and thus assures a large surface area contact for the adjacent clamp shank surface. Particularly when the U-shaped clamp section is provided with projections which locally penetrate into this elastic layer, the mechanical clamping of the shaped brackets onto the edge area provided with the elastic layer creates a connection between the glass plate and the bracket which on the one hand is secure and durable and on the other hand provides the necessary seal against water or humidity.

Suitable materials for the elastic layer to be applied to the glass surface include curable sprayable by means of a spray nozzle of extrudable plastic compounds, i.e. those that can be applied to the glass plate by means of an extruding nozzle. Especially suitable are moisture-curing single component polyurethane compounds, such as those described in U.S. Pat. No. 3,779,794. Of course, other materials can be used for this purpose, to the extent that they have the desired elastic characteristics, can be easily applied to the window glass, and, if necessary by means of an intermediate primer, adhere well to glass.

In its preferred use, the invention is employed with lowerable door windows for motor vehicles, because in this use they exhibit the above-mentioned advantage. That is, the mounting of the shaped brackets can take place directly on the vehicle assembly line. Therefore, motor vehicle crank-type door windows are described in the exemplary embodiments which are provided along their two vertical edges with shaped brackets having a cross section with the approximate shape of an E. While one U-shaped section of the shaped bracket serves for the clamp mounting on the window, the other U-shaped section of shaped bracket serves to attach and guide the window in its frame.

The window glass 1 generally consists of a monolithic prestressed glass plate about 4 mm thick. A 1 or 2 cm wide and about 0.5 to 2 mm thick strip of an elastic layer 4 is arranged along the two side edges 2, namely the edges that are vertical in the installed condition of the window, on the surface of the glass which faces the passenger compartment when installed. An adhesive agent layer 5 is located between the layer 4 and the surface of the glass. In its cured condition, the layer 4 has rubber elastic characteristics and is elastically deformable under the effect of the shank 8 of the shaped bracket 9, so that it adapts to the surface of this shank 8 and assures a large area on contact between the shank 8 and the layer 4.

Immediately subsequent to the manufacture of the glass, i.e. at a point in which the surface of the glass is still highly active from the previous heat treatment process and has no impurities, first a coating 5 of a primer adapted to the adhesive substance used for the layer 4 is applied. Silanes, such as those described in U.S. Pat. No. 3,779,794, for example, are used as the primer. Depending on the type of primer and the temperature, the primer requires a period of from 2 to 5 minutes to cure. As soon as the primer layer has cured, with the aid of a suitable extruding nozzle and approximately 2 mm layer of a pasty moisture-curing single component polyurethane adhesive compound is applied to the primer layer 5, namely in a composition such as is described in U.S. Pat. No. 3,779,794. If necessary the viscosity can be adjusted to the desired value by heating or regulating the temperature of the extruded compound.

To accelerate the curing process, there then follows a treatment with water steam. In place thereof, the entire glass plate can be submerged in a hot or boiling water bath, i.e. the glass plate can be taken through a hot water bath. In this manner at least a sufficiently thick surface layer of the layer 4 is cured within a few minutes.

After the surface curing or complete curing of the layer 4, the glass plate 1 can be packed in the usual manner and transported. The layer 4 can serve simultaneously as a spacer between the glass plates during stacking and transportation. It also provides a certain amount of protection for the edges of the glass plate against mechanical stresses. This protective function can be further increased if the layer 4 is also applied, perhaps in a thinner layer, to the edge 2 of the glass plate.

The mounting of the shaped bracket 9 on the window glass 1 takes place in the motor vehicle assembly line. The shaped bracket 9 must have a sufficient elasticity to produce a good force-fitting connection with the window glass 1 solely by its clamping effect. It is therefore effective for purposes of the invention for the shaped brackets to be made of elastic sheet steel. The bracket shank 8 has a shape such that in the longitudinal direction it forms a projecting edge 10 on the side facing the layer. This projecting edge 10 penetrates into the elastic layer 4 and assures a uniform force-fitting connection between the shaped bracket 9 and the window glass 1.

Figure 2:
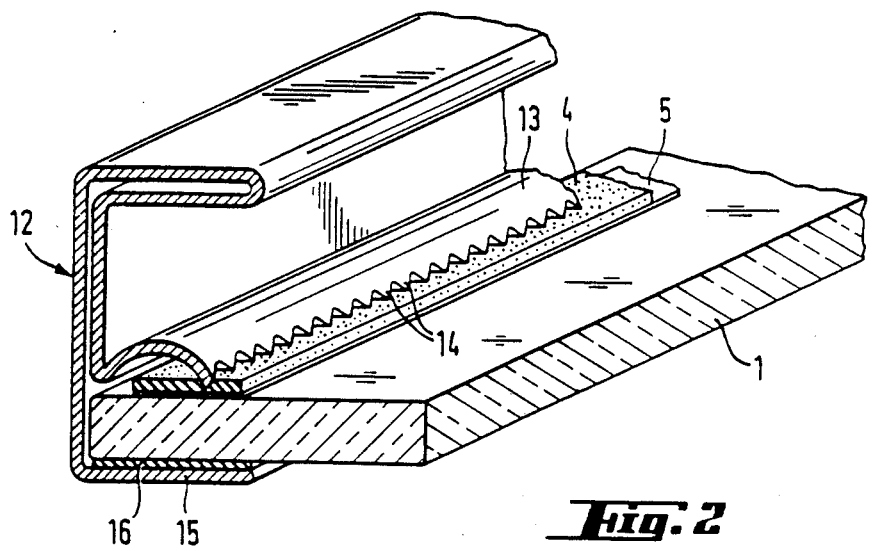

In the embodiment illustrated in FIG. 2, the window glass 1 is manufactured with the elastic layer 4 in the same manner as was described in conjunction with FIG. 1, and the shaped brackets 12 are again mounted onto the edges of the window glass in the assembly line for the motor vehicle. The bracket shank 13 of the shaped bracket 12, which is also made of elastic steel sheet and is in contact with the layer 4, is cylindrically curved so that the front edge of the shank 13 is directed toward the layer 4 at an acute angle. The front edge of the shank 13 is toothed, so that tooth-like projections 14 are formed which penetrate into the layer 4 and assure a durable connection.

With this embodiment of the shaped bracket 12 it is recommended to undertake the curing process of the layer 4 in such a manner that only the surface strata of the layer 4 are hardened. During the mounting of the shaped brackets 12, the projections 14 penetrate through this cured surface stratum into the deeper, still uncured strata of the layer 4. In this manner, in addition to the pure mechanical clamp connection comes a certain adhesive effect between the projections 14 and the lower strata of the layer 4, thus achieving a particularly good and durable attachment of the shaped bracket 12 to the window glass 1.

An additional improvement in the adhesion of the shaped bracket to the window glass 1 can be achieved if the bracket shank 15, which overlaps the window 1 on the side opposite the bracket shank 13, is provided with a thin, soft coating 16.

The window glass 1 in the embodiment illustrated in FIG. 3 is also manufactured in the same manner as was described above in conjunction with FIG. 1, in that it is provided immediately after the prestressing process with a primer layer 5 and an elastic layer 4. Furthermore, the shaped bracket 17 of spring elastic steel sheet again has an E-shaped cross section, whereby the center bracket shank 18 abuts with an elastic compressive effect against the layer 4. In the area abutting the layer 4 the shaped bracket 18 is provided with holes 20. The material of the elastic layer 4 penetrates slightly into these holes and thus strengthens the mechanical adhesive effect between the shaped bracket 17 and the window glass 1.

With this embodiment it is also possible to produce the holes 20 in the shaped bracket 18 by a stamping process in such a manner that small projections are formed along the edges of the holes on the side adjacent the layer 4. These projections penetrate into the layer 4 and provide an additional hold.

The mounting of the shaped bracket 16 again takes place, for purposes of the invention, in the manufacturing plant of the motor vehicle, while the layer 4 is applied to the window glass in the manufacturing plant of the glass plate 1 immediately after the prestressing treatment on the glass plate 1.

The elastic layer on the window glass 1 can also include an uneven, for example rippled, surface, such as that shown in FIG. 4. In this case the layer 22 has been formed with a toothed extruding nozzle, so that a surface with parallel rippling is produced. A layer 22 formed in this manner, which in turn is connected with the window glass 1 via an intermediate primer layer 5, has an increased resiliency on the surface and can better adapt to the surface of the shaped bracket abutting it.

Having now fully described the present invention, it will be apparent to one of ordinary skill in the art that many changes and modifications can be made thereto without departing from the spirit or scope of the invention as set forth herein.

What is claimed is:

1. A method of manufacturing a window glass for motor vehicles, which, after producing the glass, comprises:
   (a) applying a layer of a pasty, curable elastic polymer to the surface of said glass,
   (b) curing said elastic polymer layer on the surface of said glass, and
   (c) pushing a spring-elastic, force-fitting clamping shaped bracket onto said cured elastic polymer layer to locally partially deform the elastic polymer, wherein said shaped bracket is provided with holes into which the material of the elastic polymer layer partially penetrates.

2. In a lowerable door window for motor vehicles, the improvement comprising a window glass having attached thereto at least one shaped metallic bracket having a U-shaped cross-section, wherein said shaped metallic bracket is permanently attached to said window glass by a clamping means, wherein the clamping means is an abutting spring-elastic shaped shank part of said metallic bracket which is force-fittingly clamped onto an edge area of said window glass, said edge area being provided on at least one surface thereof overlapped by said shaped metallic bracket with a raised layer of highly elastic polymer bonded to said glass surface, said highly elastic polymer being locally partially elastically deformed by said forcefitted abutting shaped shank, thus producing a large surface force connection to the abutting shaped shank, wherein an adhesive means is used only to bond said highly elastic polymer to said glass surface, and wherein said metal bracket is provided with holes into which the material of the highly elastic polymer partially penetrates.

* * * * *